US010121250B2

United States Patent
Chu et al.

(10) Patent No.: US 10,121,250 B2
(45) Date of Patent: Nov. 6, 2018

(54) IMAGE ORIENTATION DETECTION

(71) Applicant: International Business Machines Corporation, Armonk, NY (US)

(72) Inventors: Stephen Chu, Beabercreek, OH (US); Min Gong, Shanghai (CN); Chang Sheng Li, Beijing (CN); Dong Sheng Li, Shanghai (CN); Jun Chi Yan, Shanghai (CN); Weipeng Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 15/366,478

(22) Filed: Dec. 1, 2016

(65) Prior Publication Data
US 2018/0158188 A1    Jun. 7, 2018

(51) Int. Cl.
*G06K 9/34* (2006.01)
*G06T 7/00* (2017.01)

(52) U.S. Cl.
CPC .......... *G06T 7/0042* (2013.01); *G06T 7/0081* (2013.01); *G06T 2207/10004* (2013.01); *G06T 2207/20081* (2013.01)

(58) Field of Classification Search
CPC .......... G06T 7/0042; G06T 7/0081; G06T 2207/10004; G06T 2207/20081; G06K 9/00463; G06K 9/3208; G06K 9/2054; G06K 2209/01
See application file for complete search history.

(56) References Cited

U.S. PATENT DOCUMENTS

| | | | |
|---|---|---|---|
| 6,169,822 B1 | 1/2001 | Jung | |
| 8,175,388 B1 | 5/2012 | Fisher | |
| 8,358,321 B1 | 1/2013 | Weidner | |
| 8,643,741 B2 | 2/2014 | Brunner | |
| 8,787,702 B1 | 7/2014 | Withers | |
| 2003/0152289 A1* | 8/2003 | Luo | G06K 9/00664 382/289 |
| 2005/0219616 A1* | 10/2005 | Furuta | G06K 9/2054 358/1.18 |
| 2006/0033967 A1* | 2/2006 | Brunner | G06K 9/00469 358/474 |
| 2009/0317000 A1* | 12/2009 | Efimov | G06K 9/3208 382/216 |

(Continued)

FOREIGN PATENT DOCUMENTS

EP    2442562    4/2012

OTHER PUBLICATIONS

Yu, C., et al., "A Text Detection and Orientation Restoration System for Mobile Devices", Proceedings of the Eighth International Conference on Intelligent Information Hiding and Multimedia Signal Processing, Jul. 18-20, 2012, pp. 1-4.

*Primary Examiner* — Ali Bayat
(74) *Attorney, Agent, or Firm* — Fleit Gibbons Gutman Bongini Bianco PL; Donna Flores

(57) ABSTRACT

Embodiments of the present disclosure relate to a new approach for image orientation detection. In the computer-implemented method, at least one character area in an image is sampled. The orientation of the sampled character area is determined, and the orientation of the image is determined based on the determined orientation of the sampled character area.

13 Claims, 3 Drawing Sheets

(56) References Cited

U.S. PATENT DOCUMENTS

2010/0316295 A1* 12/2010 Morimoto .......... G06K 9/00463
382/182
2011/0268351 A1* 11/2011 Huo ................... G06K 9/00409
382/161

* cited by examiner

IMAGE ORIENTATION DETECTION

BACKGROUND

The present invention relates to image orientation detection, and more specifically, to a method for determining orientation of an image containing text.

Nowadays, various information may be obtained from a portable computing system, such as a mobile phone or a Tablet PC. The information displayed on the screen of the portable computing system may have an orientation different from the orientation of the portable computing system, especially for image information. To facilitate a user in viewing an image, the orientation of the image should adapt to the orientation of the computing system. Usually, a gravity sensor is used in traditional solutions to determine the orientation of the device, and then during the operation of the device, if the device is rotated, the displayed image information is rotated automatically as well. However, automatic rotation is not always advantageous, because when the device is rotated, the image information displayed may not need to be rotated simultaneously, especially for an image containing text.

SUMMARY

Example embodiments of the present disclosure provide a new approach for determining orientation of an image containing text.

In one embodiment, a device is provided. The device includes a processing unit and a memory coupled to the processing unit and storing instructions thereon. The instructions may be executed by the processing unit to perform acts including: sampling at least one character areas in an image; determining the orientation of the sampled character area respectively; and determining orientation of the image based on the determined orientation of the sampled character area.

In another embodiment, a computer-implemented method is provided. In the method, at least one character area is sampled in an image. Orientation of the sampled character area is determined, and orientation of the image is determined based on the determined orientation of the sampled character area.

In yet another embodiment, a computer program product is provided. The computer program product is tangibly stored on a non-transient machine-readable medium and comprises machine-executable instructions. The instructions, when executed on an electronic device, cause the electronic device to perform the following operations. The operations comprise: at least one character area in an image is sampled. The orientation of the sampled character area is determined, and the orientation of the image is determined based on the determined orientation of the sampled character area.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to". The term "a" is to be read as "one or more" unless otherwise specified. The term "based on" is to be read as "based at least in part on". The term "one embodiment" and "an embodiment" are to be read as "at least one embodiment." The term "another embodiment" is to be read as "at least one other embodiment".

As used herein, the term "image" refers to a picture in electronic format, which could be implemented as any format of digital file, such as JPEG, BMP files etc. As used herein, the term "orientation" refers to the direction of the image in a predetermined coordinated system, and a "character" is a written symbol that is used in a language. Other definitions, explicit and implicit may be included below.

Figure 1:
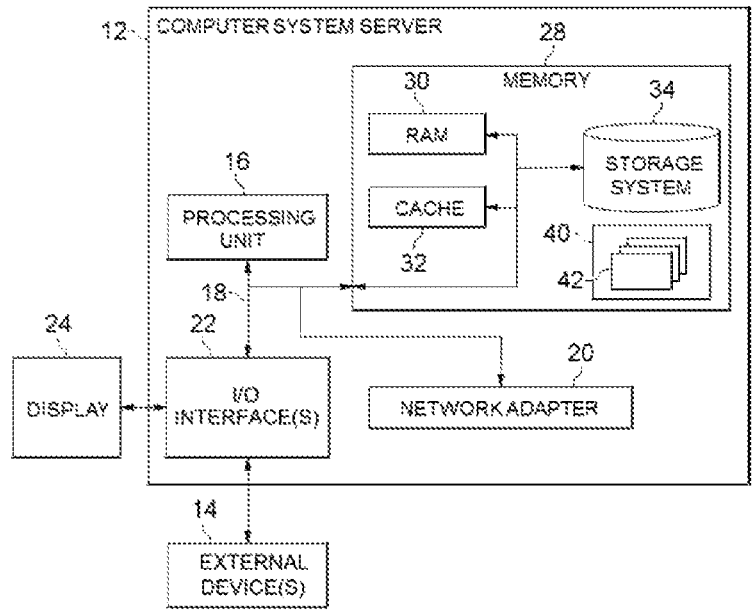
FIG. 1 is a block diagram of a computer system/server suitable for implementing embodiments of the present disclosure.

Reference is first made to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Conventionally, a gravity sensor is used to determine the orientation of a mobile device, and the orientation of the device is treated as a default device pose by which a user is holding it. When the device is rotated, the rotating signal is obtained by the gravity sensor, and the information displayed on the device is rotated adaptively in order to keep the original image orientation and rescale the image to fit with the layout of screen, so as to facilitate the user in browsing the image information on the mobile device. As described above, sometimes adaptive rotation is advantageous, and sometimes not. The specific reason may be that the image usually was not captured in an ideal orientation, especially for an image containing text. Thus, when the device is rotated, the image information may not have to be rotated simultaneously, or even though the image information has to be rotated, the rotated angle does not match the orientation of the image information. In other words, the image may be rotated undesirably or inaccurately in the existing solution, detracting from the user experience.

In order to at least partially solve the above and other potential problems, a new approach for detecting orientation of a hand-held device is provided herein. The orientation of an image containing text shall be aligned with the device pose by which a user is holding the device when the user is viewing the information. According to embodiments of the present disclosure, character areas are sampled only on a few and scattered portion of the image rather than on the whole image, and thus a faster and more robust performance is achieved. Moreover, in order to facilitate the process of sampling, it is advantageous to find an appropriate character area with an appropriate size before sampling the character area.

Figure 2:
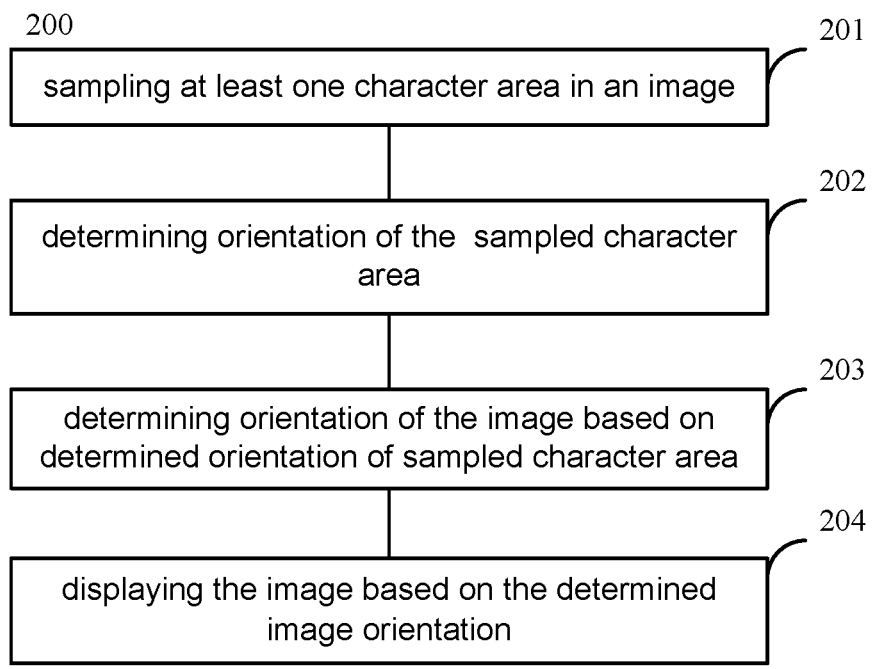
FIG. 2 is a flowchart of a method for determining orientation of a image in accordance with embodiments of the present disclosure.
Figure 5:
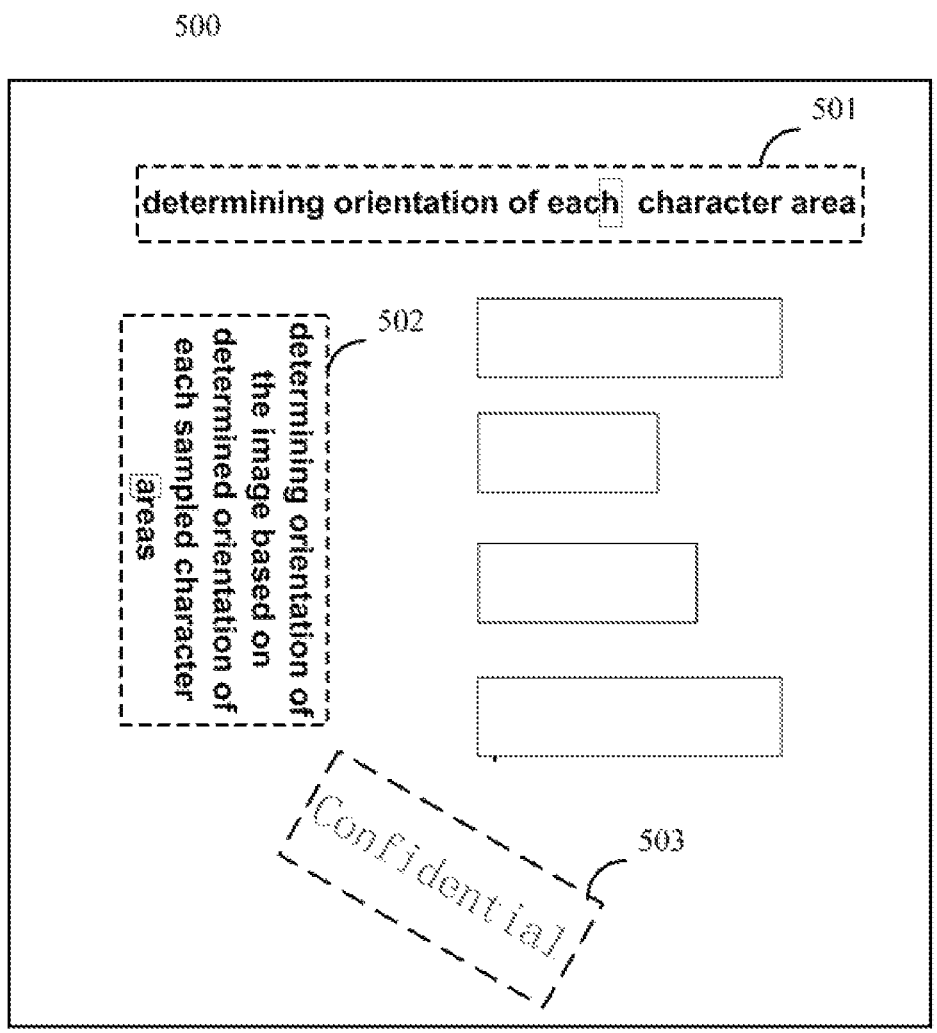
FIG. 5 is an image showing an example of an image containing text in accordance with embodiments of the present disclosure.

FIG. 2 is a flowchart of a method 200 for determining the orientation of an image in accordance with embodiments of the present disclosure. The method 200 will be described with reference to FIG. 5, which shows an example of an image containing text in accordance with embodiments of the present disclosure. In step 201, at least one character area in an image is sampled.

The image may be various types of digital documents. In some embodiments, the image may be acquired from an image capturing device, such as a camera or a scanner, e.g., a photo taken by a camera of a cell phone or a scanned copy of printed pages, faxes and business cards. It is to be understood that although an image could be an independent digital image, such as JPEG, BMP file, the image also could be embedded in a digital document, such as WORD, PDF or other types of digital documents.

A character area may be a block area in the image that contains a character. Several exemplary character areas have been shown in FIG. 5, for example, one rectangle area that contains the character 'h' resides in dashed box 501, and another rectangle area that contains the character 'a' resides in dashed box 502.

To sample a character area does not mean to recognize what the character exactly is, but to recognize the orientation of the character instead. In some embodiments, a character-level orientation classifier/regression model is trained to sample the character areas.

In an embodiment, only one character area is sampled, but it should be understood that for an image full of text with the same orientation, the sampled one character area can represent the whole image, and thus, only sampling one character area works well.

In another embodiment, to further improve the adaptability of the method, a plurality of character areas may be sampled in the image. In order to further decrease the workload of sampling, the plurality of character areas may be sampled in the image evenly or randomly.

In some embodiments, character areas may be sampled in the image directly. In the case of an image full of texts, sampling character areas directly is workable, but for an image including both text and non-text information, such as a bar graph shown in FIG. 5, it may be difficult to sample one or more character areas rapidly and accurately under the interference of the non-textual information.

In some embodiments, to further increase the speed of sampling, at least one text region in an image is detected at first, and then the at least one text region may be sampled in the detected text region rather than being sampled in the image directly as described above.

The image may comprise at least one text region and usually, the text region is a rectangle area that contains plurality of characters which may take over single line or multiple lines. Several exemplary text regions, such as the dashed box 501, 502 and 503, with different sizes or different orientations have been shown in FIG. 5.

It is to be understood that other shapes of text region are also possible.

Text region detection in an image could be realized via trained detectors. Although extracting textual information from a natural image is a challenge, there are many existing technical solutions which could be used in training the detector. In one embodiment, Convolutional Neural Networks (CNN) based text region detector by supervised deep learning could be implemented. In another alternative embodiment, the text regions could also be detected based on a widely used image operator called the Stroke Width Transform. It is to be understood by those skilled in the art that, in current disclosure, the previous stated existing text region detector is only a tool for the text region detection.

In one embodiment, the image may not be fully displayed on the screen of a mobile device after being zoomed in or zoomed out, or the displayed part of the image may be changed after being dragged. In order to facilitate a user to view a current displayed part of the image, for example the part of image in dashed box 502 of FIG. 5, the detection may be performed for the displayed part of image instead of the whole image. Thus, in the embodiment, the step of detecting at least one text region in an image may further comprise detecting the text region in part of the image that is displayed in current screen. The step of determining orientation of the image based on the orientation of the sampled character areas may further comprise determining orientation of the part of the image. The step of displaying the image based on the determined image orientation may comprise rotating the image according to the orientation of the part of the image.

In order to decrease the workload of sampling, the character areas may be also sampled in the text region evenly or randomly.

According to embodiments of the present disclosure, it is advantageous to find an appropriate character area with appropriate size when sampling the character area. That is to say, the random and adaptive character sampling could be achieved via finding the appropriate size of the character area. Details will be further illustrated in the description of FIG. 4.

Compared with recognizing characters line by line from a detected text region in existing method, in one exemplary embodiment, only a portion of characters, for example 10%, in the text region are sampled for further computation via the current method.

In step 202, orientation of the sampled character area is determined. In some embodiments, orientation of the sampled character area is determined by a character orientation estimation model. In another embodiment, a character-level orientation classifier/regression model is trained based on an orientation labeled character area training set, details of which will be further illustrated in the description of FIG. 4.

The orientation may be implemented in various ways. For example, the orientation information may be implemented as a specific angle, or be implemented as plurality of directions, and details will be further described with reference to the description of the training of the estimation model in FIG. 4.

The trained character-level orientation regression/classification model can be applied to the orientation estimation of the evenly/randomly sampled single character area. Usually, the output of the trained model comprises at least the orientations of given sampled characters and corresponding confidence scores. The confidence score describes how reliable an estimated orientation is. That is, the bigger the confidence score is, the higher the degree of the reliability of the estimated orientation will be.

It is to be understood that when the orientations of characters are detected without recognizing the exact content of the characters, the character-level orientation classifier/regression model is simplified compared with the model used in character recognition, and thus the computation of the detection, the time consuming and power consumption will be greatly decreased. It is also understood that since there is no need to recognize the character, the image quality does not have to be very clear in the character-level orientation classifier/regression model.

In step 203, orientation of the image is determined based on the determined orientation of sampled character area.

In one embodiment, the orientation of a given sampled character and corresponding confidence score can be determined through the previous stated character-level orientation regression/classification model. In a further embodiment, the orientation of the image may be determined based on statistic value, such as weighted average, of the determined orientation and confidence score of each single character area. In a specific implementation, the weight of each character area may be associated with focal length information of each character area, because the more proper focal length the character area has, the more credible the angle of that character area is. It is to be understood that besides the focal length information, other types of parameters related to the image quality of the character area are also possible to be used in weighting, such as resolution ratio. Taking FIG. 5 as an example, if one character area is sampled from dashed box 503, the sampled character area may be given a small weight, because the image quality of box 503 is not very good.

In another further embodiment, the orientation and corresponding confidence score of the text region in which the given character resides may be determined first, and then the orientation of entire image is determined based on the statistical value of at least one text region.

In one embodiment, the step of determining the orientation of the image based on the determined orientation of a sampled character area may comprise re-weighting and voting for the final orientation. Specifically, weights of the estimated orientation from each character area and the associated confidence score are used to compute the final orientation estimation.

In accordance with another embodiment of this disclosure, in the case of sampling a lot of character areas to reduce noise from these character areas in the future, a further filter could be used. The examples include but are not limited to: K character areas with smallest confidence score are removed, or character areas with the smallest confidence scores are configured to a very low weight when orientation of the image is determined based on the orientation of sampled character areas.

In step 204, the image is displayed based on device pose and the determined image orientation. Usually, the device pose is determined by various existing detectors, such as a gyroscope or accelerometer. In one embodiment, if the determined image orientation is different from the orientation of the screen, the image will be rotated according to the determined image orientation.

In another embodiment, the image is rotated according to orientation of part of the image that is displayed in the current screen, and thus for the image comprising a plurality of text areas with different orientations, the user could view the current displayed text in a correct orientation without being influenced by other text areas.

According to a method 200 of the present disclosure, when the orientation of characters is detected without the exact content of the character being recognized, the computation of the detection is simplified and thus the time and power consumption are decreased greatly.

Figure 3:
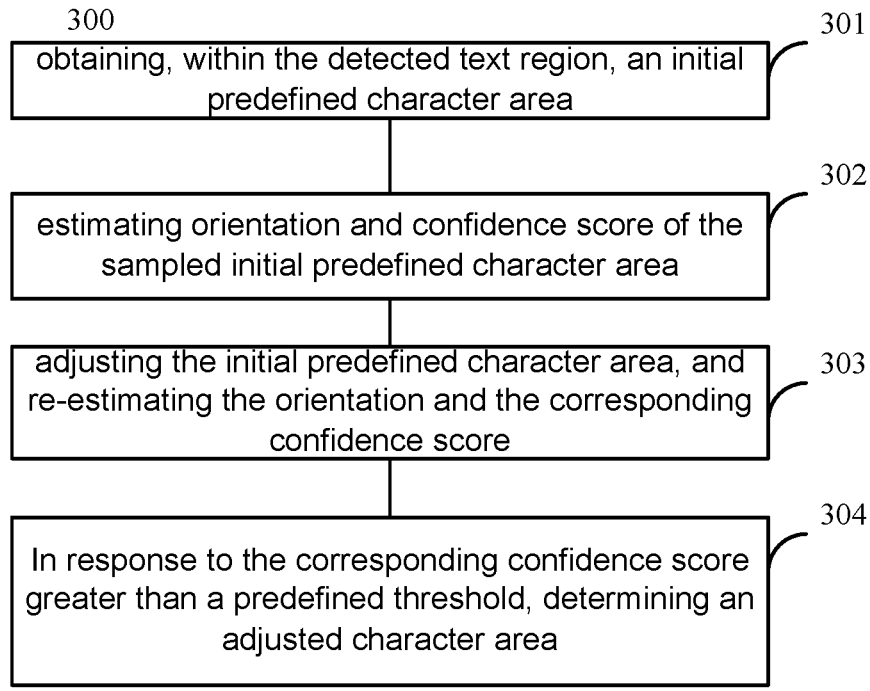
FIG. 3 is a flowchart of a method for finding an appropriate size of the character area when sampling characters in the text region in accordance with embodiments of the present disclosure.

FIG. 3 is a flowchart of a method for finding an appropriate size of the character area sampled in the text region in accordance with embodiments of the present disclosure.

In step 301, an initial predefined character area is obtained within the detected text region. In an embodiment, the initial predefined character area is a rectangle area with a large size in the text region. In another embodiment, the initial predefined character area may be a rectangle area with a small enough size such that the initial predefined character area would be very likely smaller than most of possible character area.

In step 302, the orientation and corresponding confidence score of the sampled initial character area are estimated. In one example, a character-level orientation classifier/regression model is trained based on a labeled orientation character train set, details of which will be further illustrated in the description of FIG. 4.

In step 303, the predefined character area is adjusted, and the orientation and the corresponding confidence score are re-estimated. In the embodiment, if a big initial predefined character area is configured, the initial predefined size can be adjusted through decreasing the size by a certain rate. While in another embodiment, if a small initial character area is configured, the initial predefined character area can be adjusted through increasing the size by a certain rate. After the initial predefined character area is adjusted, the orientation and the corresponding confidence score of the initial predefined character area can be re-estimated based on the adjusted initial predefined character area.

In step 304, in response to the corresponding confidence score being greater than a predefined threshold, an adjusted character area is determined to be used in sampling of at least one character area in the at least one text region. It is to be understood that the initial predefined character area size usually does not have an appropriate size that matches with a character, and thus the confidence score may be very low at first, but the score can be increased along with the step of adjusting of the initial predefined character area. When the increasing confidence score is greater than a predefined threshold, the adjusting is stopped, and the cut-off point is chosen to be the size of the adjusted character areas, which can be further used to sample a plurality of character areas in the at least one text region. In order to find a more proper initial character area size, the adjusted character area may be determined in response to the corresponding confidence score being stable or even beginning to decline.

Figure 4:
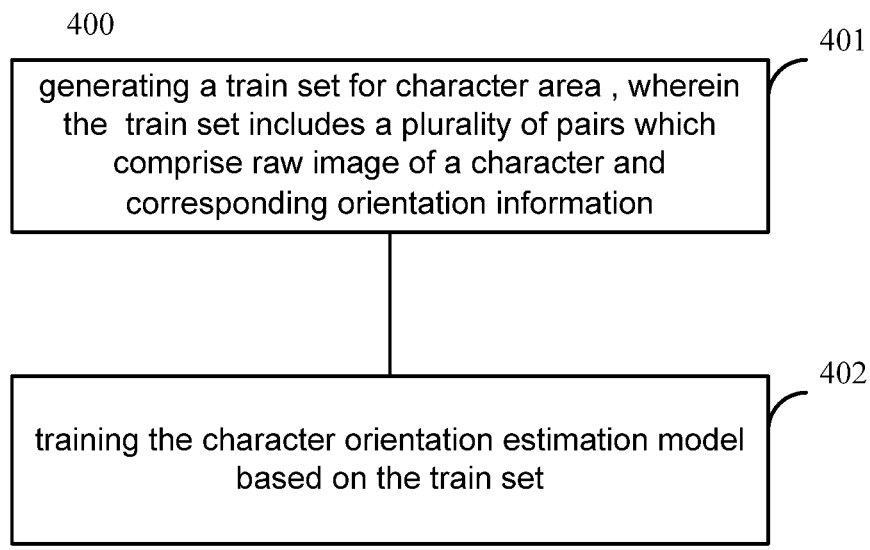
FIG. 4 is a flowchart of a method for training a character orientation estimation model in accordance with embodiments of the present disclosure.

FIG. 4 is a flowchart of a method for training a character orientation estimation model in accordance with embodiments of the present disclosure.

In step 401, a train set for a character area is generated, wherein the train set includes a plurality of pairs which comprise raw image of a character and corresponding orientation information. Each character area is a piece of raw image, and the orientation of the character is known. Thus, the character train set can be labeled according to the known orientation of the character.

As described above, there are various ways to indicate the orientation information of the character area. It is to be understood that in some embodiments the orientation information may be a specific angle. In other alternative embodiments, the orientation information may be plurality of directions. The number of directions will be chosen according to precision requirement from the users. That is, although two directions, for example 'up' and 'down', may be a very rough choice for classification, it would be enough for most cases. Therefore, according to embodiments of the present disclosure, the user may increase the number of directions to four directions (for example, up, down, right, and left), or eight or more directions, according to his/her requirement.

In some embodiments, the collected character areas may have different sizes, different orientations, or have different image qualities to enrich the train sets. According to another embodiment of the present disclosure, the collected character area can maintain a certain margin around the character to allow some noisy signals from other neighboring words or characters.

In step 402, the character orientation estimation model is trained based on the train sets. According to one embodiment of the present disclosure, logistic regression/classification model can be used in the training of the model. It is to be understood that other types of machine learning models also could be used in the training, such as SVM (Support Vector Machine learning) or Neural Networks learning.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A device comprising:
a processing unit;
a screen; and
a memory coupled to the processing unit and storing instructions thereon, the instructions, when executed by the processing unit, perform a method comprising:
sampling at least one character area in an image by:
detecting at least one text region in the image; and
sampling the at least one character area in the at least one text region by:
obtaining, within the detected text region, an initial predefined character area;

estimating orientation and corresponding confidence score of the obtained initial predefined character area;

adjusting the initial predefined character area;

re-estimating the orientation and the corresponding confidence score; and in response to the corresponding confidence score being greater than a predefined threshold, determining an adjusted character area to be used in sampling of the at least one character areas in the at least one text region;

determining orientation of the sampled character area; and determining orientation of the image based on the determined orientation of the sampled character area; and displaying the image on the screen based on the determined image orientation.

2. The device of claim 1, wherein, the displaying the image on the screen based on the determined image orientation comprises:

in response to the determined image orientation being different from an orientation of screen, rotating the image according to the determined image orientation.

3. The device of claim 1, wherein:

detecting at least one text region in the image comprises detecting the text region in part of the image displayed on the screen;

determining orientation of the image based on the determined orientation of the sampled character area comprises determining orientation of the part of the image; and displaying the image based on the determined image orientation comprises displaying the image according to the orientation of the part of the image.

4. The device of claim 1, wherein sampling at least one character area in the image comprises sampling the at least one character area in the image randomly or evenly.

5. The device of claim 1, wherein determining orientation of the sampled character area comprises determining the orientation of the sampled character area by a character orientation estimation model.

6. The device of claim 5, wherein the memory further comprises instructions for:

generating a train set for the at least one character area, wherein the train set includes a plurality of pairs which comprise a raw image of a character and corresponding orientation information; and training the character orientation estimation model based on the train set.

7. A computer-implemented method comprising:

sampling at least one character area in an image by:
 detecting at least one text region in the image; and
 sampling the at least one character area in the at least one text region by:
  obtaining, within the detected text region, an initial predefined character area;
  estimating orientation and corresponding confidence score of the obtained initial predefined character area;
  adjusting the initial predefined character area;
  re-estimating the orientation and the corresponding confidence score; and
  in response to the corresponding confidence score being greater than a predefined threshold, determining an adjusted character area to be used in sampling of the at least one character areas in the at least one text region;

determining orientation of the sampled character area;

determining orientation of the image based on the determined orientation of the sampled character area; and displaying the image on a screen based on the determined image orientation.

8. The method of claim 7, wherein, displaying the image based on the determined image orientation comprises:

in response to the determined image orientation being different from an orientation of the screen, rotating the image according to the determined image orientation.

9. The method of claim 7, wherein, detecting at least one text region in the image comprises detecting the text region in part of the image displayed on the screen;

determining orientation of the image based on the determined orientation of the sampled character area comprises determining orientation of the part of the image; and displaying the image based on the determined image orientation comprises displaying the image according to the orientation of the part of the image.

10. The method of claim 7, wherein sampling at least one character area in the image comprises sampling the character areas in the image randomly or evenly.

11. The method of claim 7, wherein determining orientation of the sampled character area comprises determining the orientation of the sampled character area by a character orientation estimation model.

12. The method of claim 11, further comprising:

generating a train set for the at least one character area, wherein the train set includes a plurality of pairs which comprise raw image of a character and corresponding orientation information; and training the character orientation estimation model based on the train set.

13. A computer program product being tangibly stored on a non-transitory machine-readable medium and comprising machine-executable instructions, the instructions, when executed on an electronic device, causing the electronic device to:

sample at least one character area in an image by:
 detecting at least one text region in the image; and
 sampling the at least one character area in the at least one text region by:
  obtaining, within the detected text region, an initial predefined character area;
  estimating orientation and corresponding confidence score of the obtained initial predefined character area;
  adjusting the initial predefined character area;
  re-estimating the orientation and the corresponding confidence score; and
  in response to the corresponding confidence score being greater than a predefined threshold, determining an adjusted character area to be used in sampling of the at least one character areas in the at least one text region;

determine orientation of the sampled character area;

determine orientation of the image based on the determined orientation of the sampled character area; and display the image on a screen based on the determined image orientation.

* * * * *